L. S. ATKINSON.
TIRE FOR VEHICLE WHEELS.
APPLICATION FILED OCT. 30, 1917.
1,346,074.
Patented July 6, 1920.
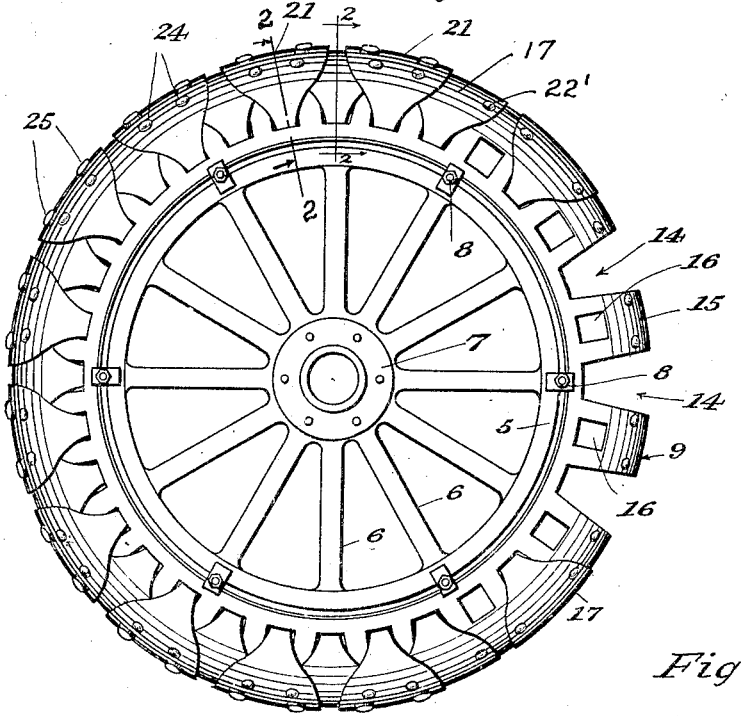
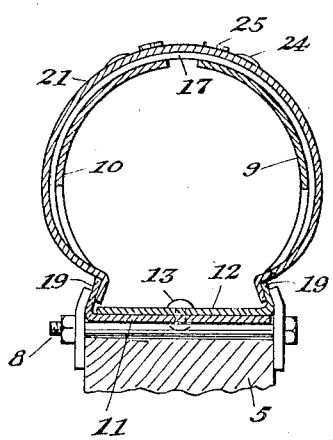
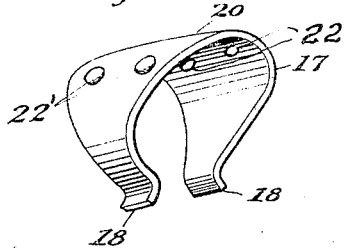
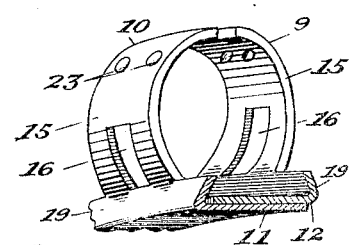
Inventor
Lloyd S. Atkinson
by
Atty.

UNITED STATES PATENT OFFICE.

LLOYD S. ATKINSON, OF LOS ANGELES, CALIFORNIA.

TIRE FOR VEHICLE-WHEELS.

1,346,074.   Specification of Letters Patent.   Patented July 6, 1920.

Application filed October 30, 1917. Serial No. 199,292.

*To all whom it may concern:*

Be it known that I, LLOYD S. ATKINSON, a citizen of the United States, residing at Los Angeles, in the county of Los Angeles and State of California, have invented new and useful Improvements in Tires for Vehicle-Wheels, of which the following is a specification.

My invention has relation more specifically to a resilient tire for vehicle wheels.

It is an object of my invention to provide a tire construction which is particularly adapted for use on automobiles and like vehicles as a substitute for the usual form of rubber pneumatic tires now generally in use, and which tire is so constructed as to have the same general appearance and characteristics of such pneumatic tires.

A further object of my invention is to provide a tire construction composed of a plurality of members constructed and arranged so as to be exceedingly resilient, and thereby cushion shocks delivered thereto.

A still further object is to provide a metallic tire construction that may be readily and easily removed from a wheel felly, and which, by reason of its metallic character is puncture proof, strong and durable, and obviates the necessity of inflation and difficulties which are common to inflatable pneumatic tires.

Another object is to provide a tire construction in which broken parts may be readily removed and replaced when occasion demands, and which is admirably adapted for use on country or desert roads.

I accomplish the above objects by means of the construction herein described and illustrated in the accompanying drawings, in which:

Figure 1 is a side elevation of a tire applied to a vehicle wheel, parts of the construction being removed to more clearly illustrate the same.

Fig. 2 is an enlarged detail cross-section taken on line 2—2 of Fig. 1.

Fig. 3 is a perspective view of a portion of the inner tire member.

Fig. 4 is a perspective view of one of the removable outside members.

Referring more specifically to the drawing, 5 indicates the wheel felly which is mounted on spokes 6 carried by a hub 7 in the manner common in wheel constructions. This wheel felly 5 is of usual construction and preferably rectangular in cross section.

The tire constituting the present invention comprises a sheet metal structure composed of a plurality of parts in the form of an annular tube.

Detachably secured to the wheel felly by means of bolts 8 are two annular side members 9 and 10, preferably formed of spring steel and of sufficient tensile strength to withstand the load which may be imposed upon them when in place on a vehicle wheel. These annular members are provided with horizontally extending flanges 11 and 12 which are secured together by means of rivets 13 at the center thereof, as clearly shown in Fig. 2 of the drawing. The sides of said members adjacent the flanges 11 and 12 being inclined from the perpendicular so as to form engaging seats for the reception of the hooked ends of spring members 17 and 21 which will be more particularly described hereinafter. Each of said side members 9 and 10 have a plurality of cut away V-shaped portions 14 which form between such cut away portions upstanding substantially semi-circular arms 15, these arms being provided with elongated apertures 16, through which are adapted to pass the hooked ends of the spring members 21, as shown in the various figures of the drawing.

Located between each two adjacent pairs of the upstanding arms 15 is a spring member 17, the hook ends 18 engaging the annular inclined side seats 19 of members 9 and 10. The top portion 20 of the spring member 17 extends to approximately the center of the adjacent pairs of arms 15, thus forming a bridge across the space 14, and tending to hold the two side members together in a resilient relation when the tire is assembled.

Mounted in apertures 16 formed in arms 15 are other spring members 21 which are of the same configuration as members 17, as heretofore described. The hooks formed on the lower ends of members 21 pass through apertures 16 and engage the inner lower annular seats of members 9 and 10, the top portions of members 21 overlapping the spring members 17, as clearly shown in Fig. 1 of the drawing.

Each member 17 is provided on either side of the center thereof, and on its inner face, with depressions or sockets 22 which engage lugs 23 formed in the upper portion of the side members 9 and 10; the purpose of these lugs and depressions being to prevent any longitudinal creeping movement of members 17 when the same are secured to the side members 9 and 10. Members 21 are also provided with similar depressions 24 which engage with lugs 22' formed by the depressions 22 in the member 17 to prevent any creeping movement thereof.

Spring members 21 are also provided with upstanding lugs 25 which subserve the same purpose and functions of upstanding lugs on pneumatic tires, and serve to prevent any skidding effect of the spring tire.

When my tire is assembled and the weight of the vehicle imposed thereon, the spring members 17 and 21 will bind the side members 9 and 10 together and will permit of a resilient action of all the tire members and admirably sustain the weight of the vehicle on which the tires are mounted.

I have shown my tire as mounted on a rimless felly, but a type of rim felly usually employed with pneumatic tires may be employed with equal facility.

What I claim is:

1. A spring tire construction, comprising annular metallic side members having their bases secured together and separated at their free edges, and a plurality of spring members yieldingly mounted on said side members and detachably secured thereto.

2. A spring tire construction, comprising annular metallic side members having their bases secured together in rigid relation to each other and separated at their free edges adapted to be detachably secured upon a felly of a vehicle wheel, and a plurality of spring members adapted to yieldingly engage said side members.

3. A spring tire construction, comprising annular metallic side members secured together, said members adapted to be detachably secured upon the felly of a vehicle wheel, each of said side members having cutaway portions equally spaced apart around its entire circumference, a plurality of spring members mounted on said side members, one at each of the cutaway portions of said side members, and other spring members detachably mounted on said side members and overlapping the first named spring members.

4. A spring tire construction, comprising annular metallic side members, said members adapted to be detachably secured upon the felly of a vehicle wheel, each of said side members having cutaway portions equally spaced apart around its entire circumference and forming substantially semicircular spring tongues, each of said tongues being provided with an aperture, a plurality of spring members having locking tongues mounted on said side members, one at each of the cutaway portions of said side members, and a plurality of other spring members having locking tongues passing through the apertures formed in the semi-circular spring tongues to lock the same thereto.

In witness that I claim the foregoing I have hereunto subscribed my name this 8th day of October, 1917.

LLOYD S. ATKINSON.